United States Patent [19]

Hakuta et al.

[11] Patent Number: 4,740,982
[45] Date of Patent: Apr. 26, 1988

[54] METHOD OF REFINING RARE GAS HALIDE EXCIMER LASER GAS

[75] Inventors: Kohzo Hakuta, Fuchu; Minoru Aramaki, Ube; Takashi Suenaga, Yamaguchi Prefecture, all of Japan

[73] Assignee: Central Glass Company, Limited, Ube, Japan

[21] Appl. No.: 909,702

[22] Filed: Sep. 22, 1986

[30] Foreign Application Priority Data

Sep. 28, 1985 [JP] Japan .................... 60-213691
May 29, 1986 [JP] Japan .................... 61-122206

[51] Int. Cl.$^4$ .................................................. H01S 3/22
[52] U.S. Cl. .................................. 372/59; 372/55; 372/57; 423/240
[58] Field of Search ............... 372/59, 57, 55; 423/240 S; 55/71, 75

[56] References Cited

U.S. PATENT DOCUMENTS 4,031,484  6/1977  Freiberg et al. ........... 372/59
4,629,611 12/1986  Fan ........................ 423/489
4,674,099  6/1987  Turner ..................... 372/57

OTHER PUBLICATIONS

C. P. Christensen; "High Repetition..."; *Applied Physics Letters*, vol. 30, No. 9; May 1, 1977; pp. 483-484.
Excimer Lasers-1983, American Institute of Physics, "Cryogenic Gas Purification and Lifetime Extension of ArF, KrF and XeF Laser Gas Mixtures", p. 107-111.
Excimer Lasers-1983, *American Institute of Physics*, "A High Average Power Excimer Laser", pp. 66-72.
*Applied Physics* (Japanese journal), vol. 52, No. 9, pp. 749-752, "Excimer Lasers and Laser Process Techniques".

*Primary Examiner*—James W. Davie
*Assistant Examiner*—Xuan Vo
*Attorney, Agent, or Firm*—Fleit, Jacobson, Cohn & Price

[57] ABSTRACT

A laser gas used in a rare gas halide excimer laser is efficiently refined with little loss of the essential rare gas such as Kr, Ar or Xe by contact of the laser gas with a solid alkaline compound, e.g. Ca(OH)$_2$, for conversion of acidic impurities and also the halogen source gas such as F$_2$ or HCl into solid metal halides and contact of the remaining gas with zeolite which is adsorbent of the remaining impurities. When the halogen source gas comprises a highly oxidizing fluorine matter the laser gas is first brought into contact with a reactive metal, e.g. Si or Fe, to convert the oxidizing fluorine matter into metal fluorides to thereby prevent formation of O$_2$, which is obstructive to the laser operation, by reaction of the oxidizing matter with the alkaline compound. The halogen source gas too can be recovered by initially cooling the laser gas so as to cause condensation of the rare gas and impurities having relatively high boiling points and leave the halogen source gas, which is lower in boiling point, in gas phase.

10 Claims, 2 Drawing Sheets

METHOD OF REFINING RARE GAS HALIDE EXCIMER LASER GAS

BACKGROUND OF THE INVENTION

This invention relates to a method of refining a mixed gas used in a rare gas halide excimer laser by sequential treatments of the mixed gas with specially selected reactive and adsorptive agents.

Excimer lasers using rare gas halides represented by ArF, KrF, XeF and XeCl are attracting increasing interest as high-output ultraviolet lasers which will have important applications in the manufacture of semiconductor devices, in photochemical reactions and in many other fields.

Rare gas halide excimer lasers utilize a mixed gas which is comprised of a selected rare gas such as Ar, Kr or Xe, an active halogen source material such as $F_2$, $NF_3$ or HCl and an inert diluent gas such as He or Ne. The halogen source material is a highly reactive gas which readily reacts with surrounding materials such as the laser container materials. Therefore, it is inevitable that during operation of a rare gas halide excimer laser the halogen source material in the laser gas is partially consumed in unwanted reactions which give rise to formation of impurity compounds and reduction in the concentration of the halogen source material. In general the impurity compounds formed during operation of the excimer laser are halogen compounds such as $CF_4$, $C_2F_6$, $SiF_4$, HF, $SF_6$, $CCl_4$, $CClF_3$, $CCl_2F_2$ and/or $CCl_3F$ though the particulars are different depending on the composition of the employed laser gas. As the laser gas is deteriorated in such a manner the output of the excimer laser lowers considerably, so that the excimer laser cannot continuously be operated for a long period of time if no countermeasure is taken.

In industrial applications of any type of rare gas halide excimer laser it is impracticable to simply dispose of the deteriorated laser gas and replace it by a fresh laser gas since very expensive rare gases are used.

Accordingly several methods have been proposed for removal of impurities from an excimer laser gas. The proposals include a condensation method using a cold trap in which the laser gas is cooled until condensation of impurity compounds having relatively high boiling points. However, this method is ineffective for removal of impurity compounds having relatively low boiling points such as $CF_4$, and this method is not applicable to excimer lasers using a rare gas having a relatively high boiling point such as Kr or Xe because, if applied, the rare gas too undergoes condensation in the cold trap. Also it has been proposed to make the deteriorated laser gas contact with heated metallic calcium to thereby convert the gaseous impurity compounds into solid calcium compounds. However, this method cannot be deemed industrially favorable because of inconveniences of handling metallic calcium and maintaining metallic calcium at a very high temperature such as 650° C. and also because of unreactivity of some impurity compounds with metallic calcium. Another proposal is an adsorption method using either active carbon or a suitable getter material such as a Ti-Zr alloy. However, by this method only limited kinds of impurity compounds can be removed from the deteriorated excimer laser gas while much more kinds of impurity compounds are contained in the same gas.

SUMMARY OF THE INVENTION

It is an object of the present invention to provide a method of efficiently removing substantially all kinds of impurity compounds from a mixed gas used in any type of rare gas halide excimer laser.

According to the present invention, there is provided a method of refining a laser gas which is used in a rare gas halide excimer laser and contains at least one rare gas, a halogen source gas and impurities, the method comprising the steps of (1) bringing the laser gas into contact with at least one solid alkaline compound selected from alkali metal compounds and alkaline earth metal compounds to thereby convert active and acidic substances contained in the laser gas into solid metal compounds, and (2) after step (1) bringing the remaining portion of the laser gas into contact with zeolite to thereby remove the remaining impurities by adsorption.

When the laser gas comprises a highly oxidizing fluorine matter, it is preferred that the above refining method further comprises the step of bringing the laser gas into contact with a reactive metal precedent to the step (1) to thereby convert the oxidizing fluorine matter into at least one metal halide.

In this invention zeolite is used as an efficient adsorbent for most of impurity compounds contained in excimer laser gases. Zeolite is a sort of aluminosilicate represented by the general formula $aM_{2/n}O \cdot Al_2O_3 bSiO_2 \cdot cH_2O$, wherein M represents an alkali metal or an alkaline earth metal, n is valency, and a, b, c are coefficients. Zeolite is a porous material very high in gas adsorptive power. Currently, synthetic zeolites of various classes different in pore size are available under the name of molecular sieves. Advantages of zeolites or molecular sieves as industrial adsorbents include applicability to adsorption removal of almost every kind of gaseous substance by appropriate selection of pore size and possibility of repeatedly reusing the adsorbents by desorbing the adsorbed gases.

However, when zeolite is used for refining an excimer laser gas there arises a serious problem that zeolite undergoes chemical reaction with the active and acidic halogen source material, such as $F_2$ or HCl, present in the laser gas as an essential component and also with acidic impurities represented by HF, so that zeolite used for the refining purpose becomes inactive in a very short time and cannot be regenerated. For example, zeolite rapidly loses its adsorptive power even when the content of $F_2$ in the treated gas is only about 0.01%.

According to the invention this problem is solved by first bringing the laser gas into contact with a solid alkaline compound such as, for example, CaO, Ca(OH)$_2$, soda lime, NaOH, KOH, MgO or Mg(OH)$_2$ preferably at a moderately elevated temperature. By this treatment reactions take place between the alkaline compound and the halogen source gas such as $F_2$ or HCl contained in the laser gas and also acidic impurity gases such as HF, $SiF_4$ and $CO_2$. The main products of the reactions are solid metal compounds which readily separate from the treated gas. The remaining portion of the laser gas is brought into contact with zeolite. Then the remaining impurities are all adsorbed by the zeolite. Since the active and acidic halogen matter has already been removed, the zeolite long retains its adsorptive power, so that the adsorption removal of the impurities can be accomplished efficiently and continuously. When the amount of adsorption reaches saturation, desorption of the adsorbed impurities can easily be accomplished by subjecting the zeolite to a degassing treatment under reduced pressure at an elevated temperature, so that the zeolite can be repeatedly reused.

By the combination of the treatment with an alkaline compound and adsorption by zeolite all the impurities are removed from the laser gas, while the expensive rare gas such as Kr or Xe and also the rare gas used as diluent such as He or Ne are recovered with only a very small amount of loss. Accordingly the rare gases can be recycled continuously though there is the need of making up for the small loss. However, it is necessary to supply the halogen source gas such as $F_2$ or HCl to the refined and recycled rare gases since the halogen source gas too is removed during the laser gas refining process. As will be described hereinafter, the present invention includes a modified refining method by which the halogen source gas too can easily be recovered and recycled.

When the halogen source gas in the laser gas is a highly oxidizing substance such as $F_2$, $NF_3$, $ClF_3$ or ClF, it is preferred to first treat the laser gas with an active metal such as, for example, Si or Fe for the following reasons.

When the laser gas containing a highly oxidizing halogen source gas is directly brought into contact with the alkaline compound the halogen source gas reacts with the alkaline compound to liberate oxygen gas. For example: $F_2 + Ca(OH)_2 \rightarrow CaF_2 + \frac{1}{2}O_2 + H_2O$. In the excimer laser, $O_2$ in the recycled gas is converted into $O_3$ (ozone) by the exciting energy produced by discharge or alternative means. Ozone has a strong light adsorption over a wide range with a peak at about 300 nm. Therefore, the ozone formed in the excimer laser absorbs the laser energy in the same wavelength range and causes significant lowering of the laser output. Accordingly it is necessary to prevent the refined and recycled laser gas from containing $O_2$.

Zeolite used as the adsorbent in this invention does not efficiently adsorb $O_2$ which is very low in polarity, and the adsorbed $O_2$ is easily desorbed by small changes in pressure and/or temperature. If a very large quantity of zeolite is used to increase the adsorption capacity for $O_2$, the result is usually an increase in the concentration of $O_2$ in the refined gas because considerable amounts of expensive rare gases such as Kr and Ne are adsorbed by the increased zeolite. It is conceivable to make react $O_2$ formed by the treatment of the laser gas with the alkaline compound with a certain reactant to convert $O_2$ into a solid oxide, e.g. CuO, which can easily be removed or into a gaseous oxide, e.g. $SO_2$, which can easily be adsorbed by zeolite. However, this is unfavorable because costly high temperature reaction apparatus and incidental cooling apparatus are required for reacting $O_2$ which is rather weak in reaction activity.

We have succeeded in preventing intrusion of $O_2$ into the refined laser gas by first treating the laser gas containing a highly oxidizing halogen source gas with a reactive metal. The reactive metal can be selected from various metals which readily react with any of the aforementioned highly oxidizing halogen source gases such as $F_2$, $NF_3$, $ClF_3$ and ClF to form metal halides. When the reactive metal is selected from Si, Ge, P, Sb, S, Se, Te, W, Mo and V the reaction gives gaseous fluorides as represented by $SiF_4$ and $GeF_4$, and such gaseous fluorides can be removed from the treated laser gas by the subsequent treatment with the alkaline compound or adsorption by zeolite. When the reactive metal is selected from Fe, Cr, Mn, Co, Zn, Ti, Zr, Sn and Pb the reaction gives solid fluorides as represented by $FeF_3$ and $MnF_4$, and such solid fluorides naturally separate from the treated laser gas. Usually the treatment with the reactive metal is performed at an adequately elevated temperature.

To perform refining of the laser gas by a method according to the invention without losing most of the halogen source gas such as $F_2$, $NF_3$ or HCl, it is effective to cool the laser gas before its contact with the alkaline compound to such a degree that the laser gas separates into a mixed condensate of a group of components which have relatively high boiling points and a gas phase comprised of another group of components which have relatively low boiling points. In the laser gas the principal rare gas such as Kr or Xe and most of impurity compounds have relatively high boiling points, whereas the halogen source gas such as $F_2$, $NF_3$ or HCl and the rare gas used as diluent such as He or Ne have lower boiling points. Therefore, the low temperature condensation treatment leaves the halogen source gas and the diluent gas in the gas phase. When the principal rare gas is Ar, this rare gas too will remain in the gas phase. After separation of the condensate, the mixed gas containing the halogen source gas can be recycled without further treatment. The condensate is brought into contact with the aforementioned alkaline compound to convert acidic impurity compounds into solid metal compounds, and then the remaining gas is brought into contact with zeolite. When the laser gas initially contains a highly oxidizing substance such as $F_2$ or $NF_3$, it is preferable to treat the condensate with the aforementioned reactive metal prior to the treatment with the alkaline compound because the condensate may contain a small amount of the highly oxidizing substance.

By using the present invention it is practicable to completely remove all impurity compounds from any type of rare gas halide excimer laser gas, and refining and recycling of the laser gas can be performed in a continuous manner so that the laser can be continuously operated for a long period of time without suffering from lowering of the laser output. From an industrial point of view it is also an important advantage of this invention that the essential components of the laser gas can be recovered and recycled very efficiently so that the running cost of the laser system is reduced.

DESCRIPTION OF THE PREFERRED EMBODIMENTS

Figure 1:
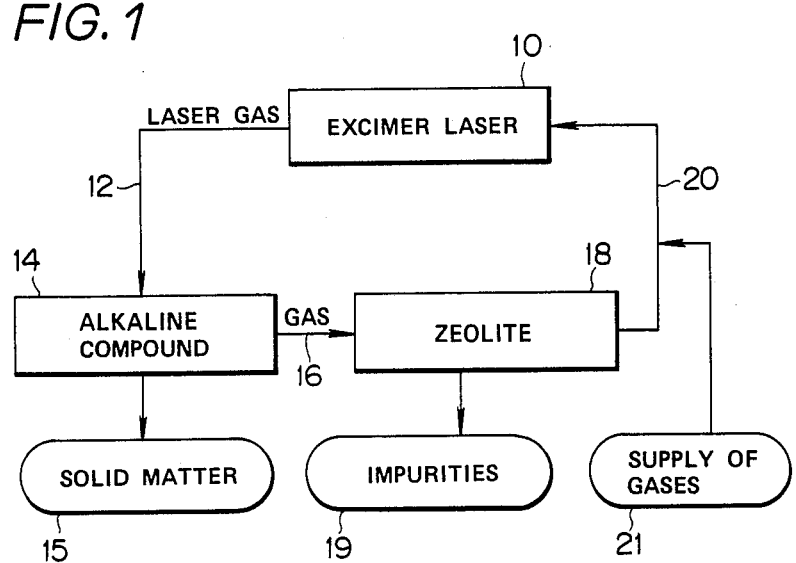
FIG. 1 is a block diagram showing the fundamental construction of an excimer laser gas refining system to perform the refining method according to the invention.

FIG. 1 shows a gas refining system to refine a laser gas extracted from an excimer laser device 10 using a rare gas halide excimer such as, for example, ArF, KrF or XeCl and to recycle the refined laser gas to the excimer laser device 10. The gas extracted from the excimer laser device 10 is principally a mixture of a rare gas such as Ar, Kr or Xe, an active halogen source material such as $F_2$ or HCl and an inert diluent gas such as He or Ne, and this gas contains various impurities as mentioned hereinbefore.

The laser gas is introduced, via line 12, into a reaction tube 14 packed with a solid alkaline compound which reacts with the active halogen source material such as $F_2$ or HCl and also with some acidic impurity compounds such as HF and $SiF_4$. That is, the active halogen source material and acidic impurities are removed from the treated laser gas, as indicated at 15 in FIG. 1. Then the remaining portion of the laser gas is passed, via line 16, to a tube 18 packed with zeolite which is adsorbent of the remaining impurites indicated at 19, such as $C_2F_6$, $CCl_4$, $CCl_2F_2$, $CClF_3$ and $CCl_3F$. Therefore, the gas which has passed through the zeolite tube 18 is a pure mixture of the principal rare gas such as Ar, Kr or Xe and the diluent gas such as He or Ne. Via line 20 the rare gas mixture is returned to the excimer laser device 10. To make up for the removal of the active halogen source material at the alkaline compound tube 14 and practically inevitable loss of a very small portion of the rare gases, appropriate amounts of the active halogen source material such as $F_2$ or HCl and rare gases such as Ar, Kr or Xe and He or Ne are supplied, as indicated at 21, to the rare gas mixture passing through the line 20.

The solid alkaline compound in the tube 14 is usually selected from CaO, $Ca(OH)_2$, soda lime, NaOH KOH, MgO and $Mg(OH)_2$. The alkaline compound is granulated or pelletized so as to make good contact with the laser gas introduced into the tube 14 and so as not to be scattered by the flow of the laser gas. The treatment of the laser gas with the alkaline compound can be performed at an arbitrary temperature between room temperature and about 500° C. In practice, however, it is favorable to operate the alkaline compound tube 14 at a temperature in the range from about 80° C. to about 200° C. with consideration of both the reactivity and the ease of operation.

The zeolite in the tube 18 is selected from conventional synthetic zeolites with particular attention to the size of micropores in zeolite according to the composition of the mixed gas subject to treatment. In general, for refining of laser gases used in rare gas halide excimer lasers the most suitable zeolite is Molecular Sieve 5A supplied from Linde Co. of U.S.A. It is also possible to use zeolite of a different class or a combination of two or more kinds of zeolite different in pore size. In the zeolite tube 18 the adsorption of the impurity compounds increases as the temperature is lower and as the pressure is higher. In practice the zeolite tube 18 is operated at a temperature between about −180° C. and about 100° C., and at an arbitrary pressure within the pressure limitation to the apparatus. When the adsorption of the zeolite in the tube 18 reaches saturation the adsorbed impurity compounds can easily be desorbed by a degassing treatment of the zeolite under heating, so that the adsorptive power of the zeolite can be restored.

Figure 2:
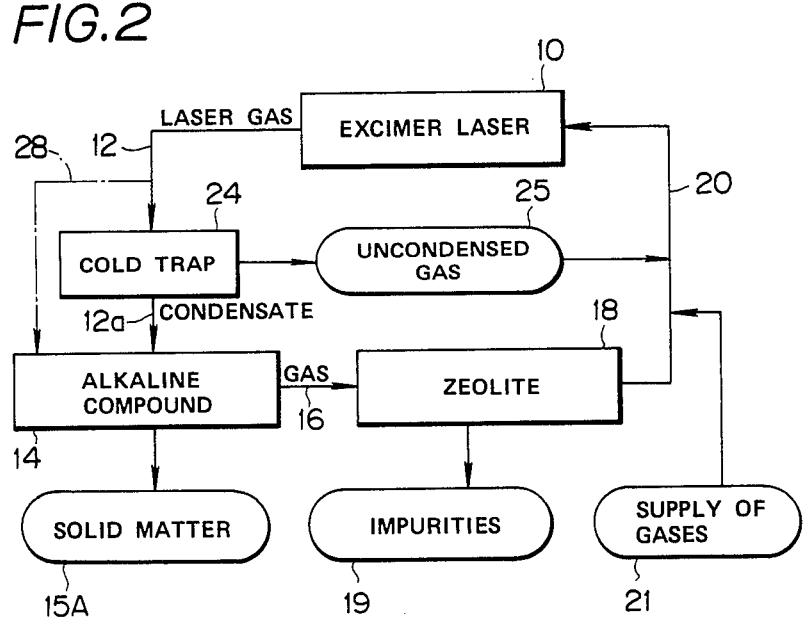
FIG. 2 is a block diagram showing the addition of an optional cold trap to the gas refining system of FIG. 1.

Referring to FIG. 2, it is favorable to interpose a cold trap 24 between the excimer laser device 10 and the alkaline compound tube 14. The cooling medium for the cold trap 24 is liquid nitrogen, liquid argon, liquid oxygen or liquid air, and the cold trap 24 is maintained at a suitable temperature between about −200° C. and about −120° C. In the cold trap 24 the laser gas is cooled such that the principal rare gas Kr or Xe which is high in boiling point and the impurities having relatively high boiling points such as HF, $C_2F_6$, $SiF_4$, $SF_6$, $CCl_4$, $CClF_3$, $CCl_2F_2$ and $CCl_3F$ undergo condensation. The mixed condensate separates from a gas phase indicated at 25, which is comprised of the low boiling point halogen source material such as $F_2$ or HCl and diluent gas such as He or Ne. When the principal rare gas in the laser gas is Ar, it also remains in the gas phase 25. The uncondensed gas phase 25 is returned to the excimer laser device 10 via line 20 without further treatment.

Via line 12a the condensate is transferred from the cold trap 24 to the alkaline compound tube 14, which is operated at an elevated temperature as mentioned with reference to FIG. 1. Among the impurities introduced into the alkaline compound tube 14 the acidic matter such as HF and $SiF_4$ are removed, as indicated at 15A, by reaction with the alkaline compound. The remaining gaseous mixture is passed to the zeolite tube 18 described with reference to FIG. 1. In the zeolite tube 18 the remaining impurites 19 such as $C_2F_6$, $SF_6$, $CCl_4$, $CCl_2F_2$, $CClF_3$ and $CCl_3F$ are removed by adsorption from the principal rare gas such as Kr or Xe.

When the cold trap 24 is used in the above described manner there is a possibility that a few kinds of impurity compounds having relatively low boiling points, such as $CF_4$, are recycled together with the gas phase 25 of the essential materials and gradually accumulate in the excimer laser device 10. If the laser output lowers by the influence of such low boiling point impurities, the cold trap 24 in FIG. 2 is temporarily omitted by utilizing a by-pass 28 to thereby perform refining of the laser gas in the manner as described with reference to FIG. 1. Then the low boiling point impurities too are separated in the zeolite tube 18.

Figure 3:
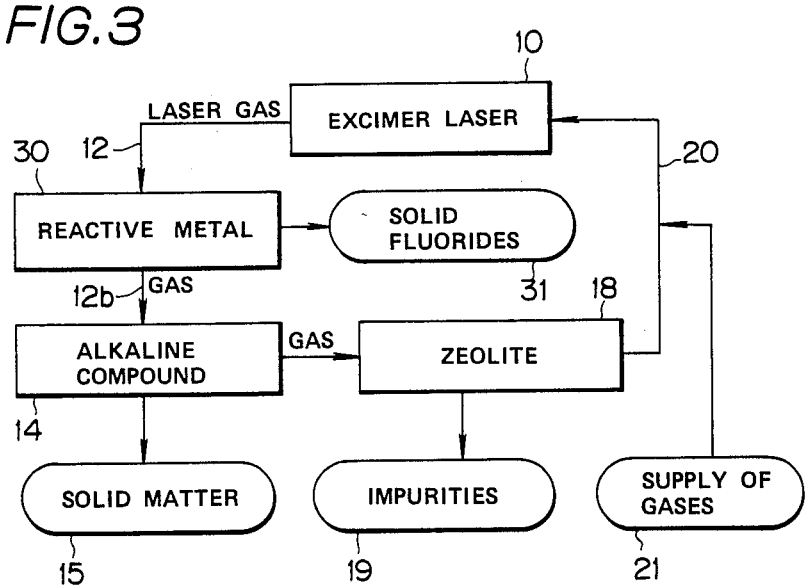
FIG. 3 is a block diagram showing the addition of a packed column of a reactive metal to the gas refining system of FIG. 1 to perform the refining method according to the invention in a preferred manner.

When the halogen source material in the laser gas is $F_2$ or $NF_3$ which is very high in oxidizing power, it is preferred to bring the laser gas into contact with a reactive metal as the initial step of the gas refining process. In FIG. 3, a reaction tube 30 packed with a reactive metal is disposed between the excimer laser device 10 and the alkaline compound tube 14 described with reference to FIG. 1. The reactive metal can be selected from Si, Ge, P, Sb, S, Se, Te, W, Mo, V, Fe, Cr, Mn, Co, Zn, Ti, Zr, Sn and Pb. A mixture of two or more kinds of metals may be used if desired. In practice, Si or Fe will be often used for economical reasons. It is suitable that the active metal in the tube 30 is in the form of granules or pellets about 1–5 mm in diameter for accomplishing efficient contact reactions without offering undue resistance to the flow of the laser gas.

The treatment of the laser gas with the active metal can be performed at an arbitrary temperature between room temperature and about 500° C. though a suitable temperature depends on the kind of the employed active metal. Though the efficiencies of the reactions of the active metal with the oxidizing substances in the laser gas are enhanced by raising the temperature, employment of a very high temperature causes considerable increase in the equipment and operation costs. When Si, W, Mo or S is used as the active metal the intended reactions proceed at high rates even at room temperature. Also when a different metal is used sufficiently rapid reactions are ensured by operating the active metal tube 30 at a temperature in the range from about 100° C. to about 500° C.

For example, when Fe is packed in the reaction tube 30 the highly oxidizing fluorine matter contained in the laser gas, such as $F_2$ or $NF_3$, reacts with Fe to turn into solid fluorides represented by $FeF_3$. As indicated at 31 in FIG. 3 the solid fluorides are separated, as impurities, from the laser gas. When Si is packed in the reaction tube 30 the highly oxidizing fluorine matter in the laser gas is converted into gaseous fluorides represented by $SiF_4$. In this case the gaseous fluorides formed in the reaction tube 30 are left in the laser gas which is passed, via line 12b, to the alkaline compound tube 14 described with reference to FIG. 1. In the reaction tube 14 the acidic and active impurity compoounds such as $SiF_4$ and $CO_2$ are removed by reaction with the alkaline compound. The remaining impurities are removed in the zeolite tube 18 by adsorption, and the refined rare gases are returned to the excimer laser device 10.

In the gas refining system of FIG. 3, the initial treatment of the laser gas with the active metal in the reaction tube 30 has the effect of preventing liberation of $O_2$ in the subsequent reaction tube 14 by reaction between the alkaline compound and fluorine.

Figure 4:
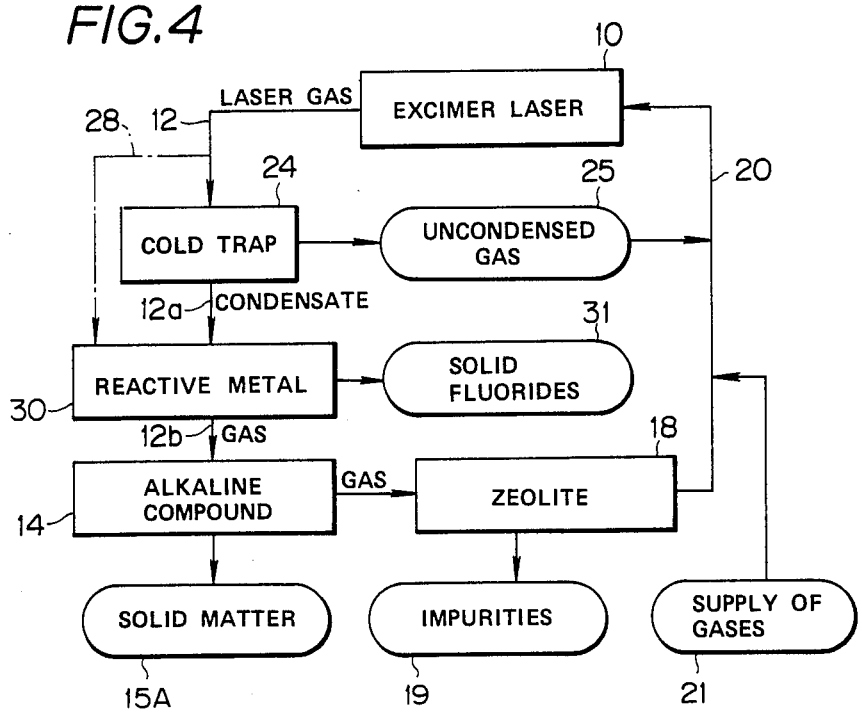
FIG. 4 is a block diagram showing the addition of the aforementioned active metal column to the gas refining system of FIG. 2.

It is preferable to utilize the cold trap 24 described with reference to FIG. 2 also in the gas refining system of FIG. 3 including the active metal tube 30. Referring to FIG. 4, the cold trap 24 is disposed between the excimer laser device 10 and the reaction tube 30 packed with the reactive metal. When the laser gas is first cooled in the cold trap 24 the low boiling point fluorine matter, $F_2$ or $NF_3$, remains in the gas phase 25 together with the diluent gas such as He or Ne. However, a very small portion of $F_2$ or $NF_3$ will be contained in the mixed condensate of the high boiling point substances. In the reaction tube 30 packed with a selected active metal $F_2$ or $NF_3$ contained in the condensate is converted into either solid fluorides represented by $FeF_3$, which are separated as indicated at 31, or gaseous fluorides represented by $SiF_4$ which is passed to the alkaline compound tube 14 together with other gaseous substances. The functions of the alkaline compound tube 14 and the zeolite tube 18 are as described hereinbefore. The by-pass 28 in FIG. 4 is for the purpose of temporarily omitting the cold trap 24 when the concentrations of low boiling point impurities represented by $CF_4$ increased, as described with reference to FIG. 2.

The laser gas refining systems of FIGS. 1-4 can be operated continuously. However, also it is possible to intermittently operate any of these gas refining systems. That is, the laser gas refining operations may be suspended until the laser output lowers to a predetermined extent by increase in the concentrations of impurities in the laser gas.

The invention is further illustrated by the following nonlimitative examples.

REFERENCE 1

A KrF rare gas halide excimer laser of the discharge excitation type using $F_2$ as the halogen source gas was operated continuously so as to make laser oscillation at a rate of 5 pulses/second. The laser gas was not subjected to any refining treatment during operation of the excimer laser. In 3 hr the laser output decreased to 40% of the initial output level.

Initially the mixed gas introduced into the laser was comprised of 5 Nl (normal liter) (5%) of Kr, 0.3 Nl (0.3%) of $F_2$ and 94.7 Nl (94.7%) of He. After operating the laser for 3 hr the concentration of $F_2$ in the laser gas was about 0.2% (by volume), and existence of $SiF_4$, HF, $CF_4$, $H_2O$, $CO_2$, $O_2$ and $N_2$ as impurities was confirmed.

EXAMPLE 1

The gas refining system of FIG. 1 was used to refine the contaminated laser gas mentioned in Reference 1 (after operating the excimer laser for 3 hr). The reaction tube 14 was 50 mm in inner diameter and 1000 mm in length, and the tube material was stainless steel (SUS 304). The tube 14 was packed with 1 kg of soda lime pellets which were 2 mm in diameter and 5 mm in length. The adsorption tube 18 was 12 mm in inner diameter and 1000 mm in length and was packed with 20 g of molecular sieve 5A. In advance the entire space in the refining system was filled with helium gas. The reaction tube 14 was operated at 100° C. and the adsorption tube 18 at room temperature.

The refining of the contaminated laser gas was accompanied by loss of 0.1 Nl of Kr. Accordingly, 0.1 Nl of Kr was added to the refined laser gas together with 0.3 Nl of $F_2$. By using the resultant mixed gas the excimer laser of Reference 1 was operated again. The laser output was about 90% of the initial output level (at the start of the laser operation in Reference 1), and existence of a small amount of $O_2$ was detected. The operation of the laser was continued for 3 hr without repeating the gas refining operations. After that the contaminated laser gas was refined by the method described in the initial part of Example 1, followed by the addition of Kr and $F_2$ to the refined laser gas. When the resultant mixed gas was used in operating the same laser the output of the laser was about 80% of the initial output level, and existence of an increased amount of $O_2$ was found.

EXAMPLE 2

The gas refining system of FIG. 3 was used to refine the contaminated laser gas mentioned in Reference 1 (after operating the excimer laser for 3 hr). The reaction tube 30 was 25 mm in inner diameter and 1000 mm in length, and the tube material was nickel. The tube 30 was packed with 300 g of metallic Si in the form of granules having diameters of 1-5 mm. Both the reaction tube 14 packed with soda lime pellets and the adsorption tube 18 packed with molecular sieve 5A were identical with the ones used in Example 1. In advance the entire space in the refining system was filled with helium gas. The reaction tube 30 containing Si as the active metal was operated at 200° C. The reaction tube 14 containing soda lime was operated at 100° C. and the adsorption tube 18 at room temperature.

The refining of the contaminated laser gas was accompanied by loss of 0.1 Nl of Kr. Accordingly, 0.1 Nl of Kr was added to the refined gas together with 0.3 Nl of $F_2$. By using the resultant mixed gas the excimer laser of Reference 1 was operated again. The laser output recovered to 100% of the initial output level. In this case $O_2$ could not be detected in the refined laser gas.

EXAMPLE 3

The gas refining system (of FIG. 3) used in Example 2 was applied to the excimer laser of Reference 1 to operate the laser in a continuous manner. During operation of the laser the laser gas was continuously refined and recycled at a rate of 2.5 l/min, while 0.0025 l/min of Kr and 0.01 l/min of $F_2$ were continuously supplied to the refined gas as indicated at 21 in FIG. 3. Every day the laser was continuously operated for 5 hr, and such operation was continued for 30 days. Every day the adsorption tube 18 packed with molecular sieve 5A was subjected to a desorption treatment in vacuum at 300° C. while the laser operation was suspended. In 30 days no decrease in the laser output was observed.

After that the Si granules in the reaction tube 30 and the soda lime pellets in the tube 14 were replaced by fresh ones, respectively. Then the excimer laser and the gas refining system were again operated in the above described manner for additional 30 days. Still no decrease in the laser output was observed.

EXAMPLE 4

The gas refining system used in Examples 2 and 3 was modified to the system of FIG. 4 by the addition of the cold trap 24 and the by-pass 28. The cold trap 24 was made of stainless steel (SUS 304) and had a capacity of 1 liter. The cooling medium for the cold trap 24 was liquid nitrogen.

The KrF excimer laser of Reference 1 was continuously operated for 30 days in the same manner as in Example 3. During operation of the laser the laser gas was continuously refined and recycled at a rate of 2.5 l/min, while 0.025 l/min of Kr and 0.001 l/min of $F_2$ were continuously supplied to the refined gas. In operating the gas refining system the cold trap 24 was always utilized. In 30 days there was no decrease in the laser output.

However, when the operation of the laser and refining of the laser gas were further continued the output of the laser gradually decreased. After the lapse of 40 days from the start of the experiment the laser output lowered to about 85% of the initial output level. The reason was accumulation of low boiling point impurities represented by $CF_4$ during repeated recycling of $F_2$ gas without contacting with zeolite. Therefore, the by-pass 28 was utilized to introduce the laser gas to be refined directly into the reaction tube 30 containing Si. In that state the operation of the excimer laser and the refining and recycling of the laser gas were carried out for 3 hr. As the result the low boiling point impurities were completely removed by adsorption in the zeolite tube 18, and the laser output recovered to 100% of the initial level. After that the by-pass 28 was closed to resume the use of the cold trap 24, and the laser 10 and the gas refining system were operated for 30 days in the same manner as in the first experiment in Example 4. No decrease in the laser output was observed.

For comparison, the reaction tube 30 containing Si was excluded from the gas refining system used in Example 4, and the first experiment in Example 4 was repeated. In this case, the laser output became about 30% of the initial level after the lapse of 40 days from the start of the experiment. Then the by-pass 28 was utilized to perform refining of the laser gas for 3 hr without utilizing the cold trap 24. As the result the output of the laser became about 60% of the initial level. This experimental result was indicative of accumulation of $O_2$ in the recycled laser gas.

EXAMPLE 5

The laser gas refining system (of FIG. 1) used in Example 1 was applied to a XeCl excimer laser. The chlorine source material was HCl gas. As a minor modification, the adsorption tube 18 was packed with 10 g of molecular sieve 5A and 10 g of molecular sieve 10X so as to form two zeolite columns in the tube 18.

Every day the laser was operated continuously for 5 hr. During operation of the laser the laser gas was continuously refined and recycled at a rate of 1 l/min, while 0.002 l/min of Xe and 0.01 l/min of HCl were continuously supplied to the refined gas. Every day the zeolite tube 18 was subjected to a desorption treatment in vacuum at 300° C. while the laser operation was suspended. The operation was continued for 30 days, but no decrease in the laser output was observed.

What is claimed is:

1. A method of refining a laser gas which is used in a rare gas halide excimer laser and comprises a rare gas, a halogen source gas comprising a highly oxidizing gas and impurities, the method comprising the steps of:
   (1) bringing the laser gas into contact with at least one reactive metal, said metal being selected from the group consisting of Si, Ge, P, Sb, S, Se, Te, W, Mo and V, to thereby convert the highly oxidizing gas into at least one gaseous metal halide;
   (2) after step (1) bringing the remaining gas into contact with at least one solid alkaline compound selected from alkali metal compounds and alkaline earth metal compounds to thereby convert active and acidic substances contained in the laser gas into solid metal compounds; and
   (3) after step (2) bringing the remaining portion of the laser gas into contact with zeolite to thereby remove the remaining impurities by adsorption.

2. A method according to claim 1, wherein said at least one alkaline compound is selected from the group consisting of CaO, Ca(OH)$_2$, soda lime, NaOH, KOH, MgO and Mg(OH)$_2$.

3. A method according to claim 1, wherein said at least one alkaline compound is kept heated at a temperature in the range from about 80° C. to about 200° C.

4. A method according to claim 1, wherein said at least one reactive metal is kept at a temperature in the range from room temperature to about 500° C.

5. A method according to claim 1, wherein said halogen source gas comprises at least one of $F_2$, $NF_3$, $ClF_3$ and ClF.

6. A method of refining a laser gas which is used in a rare gas halide excimer laser and comprises a rare gas, a halogen source gas comprising a highly oxidizing gas and impurities, the method comprising the steps of:
   (a) cooling the laser gas so as to cause condensation of a group of gaseous components which have relatively high boiling points and recovering another group of gaseous compounds which have relatively low boiling points and remain uncondensed, said another group of gaseous components including said halogen source gas;
   (b) bringing the condensate from step (a) into contact with at least one reactive metal, said metal being selected from the group consisting of Si, Ge, P, Sb, S, Se, Te, W, Mo and V, to thereby convert the highly oxidizing gas into at least one gaseous metal halide;
   (c) bringing the gas from step (b) into contact with at least one solid alkaline compound selected from alkali metal compounds and alkaline earth metal compounds to thereby convert acidic impurity compounds in the condensate into solid metal compounds; and
   (d) after step (c) bringing the remaining portion of the laser gas into contact with zeolite to thereby remove the remaining impurities by adsorption.

7. A method according to claim 6, wherein said at least one alkaline compound is selected from the group consisting of CaO, Ca(OH)$_2$, soda lime, NaOH, KOH, MgO, and Mg(OH)$_2$.

8. A method according to claim 6, wherein said at least one alkaline compound is kept heated at a temperature in the range from about 80° C. to about 200° C.

9. A method according to claim 6, wherein said at least one reactive metal is kept at a temperature in the range from room temperature to about 500° C.

10. A method of refining a laser gas which is used in a rare gas halide excimer laser and comprises a rare gas, a halogen source gas comprising a highly oxidizing gas and impurities, the method comprising the steps of:

(a) providing a stream of laser gas;
(b) splitting said stream into a first split stream and a second split stream;
(c) cooling said first split stream so as to cause condensation of a group of gaseous components which have relatively high boiling points and recovering another group of gaseous compounds which have relatively low boiling points and remain uncondensed, said another group of components including said halogen source gas;
(d) bringing said second split stream and the condensate from step (c) into contact with at least one reactive metal, said metal being selected from the group consisting of Si, Ge, P, Sb, S, Se, Te, W, Mo and V, to thereby convert the highly oxidizing gas into at least one gaseous metal halide;
(e) bringing the gas from step (d) into contact with at least one solid alkaline compound selected from alkali metal compounds and alkaline earth metal compounds to thereby convert acidic impurity compounds in the condensate into solid metal comopounds; and
(f) after step (e) bringing the remaining portion of the laser gas into contact with zeolite to thereby remove the remaining impurities by adsorption.

* * * * *